United States Patent
Salerno et al.

(10) Patent No.: US 6,191,401 B1
(45) Date of Patent: Feb. 20, 2001

(54) HEAT MAINTAINING FOOD DELIVERY CONTAINER

(76) Inventors: Mark Salerno; Roberta Salerno, both of 13 Harmony Rd., Huntington, NY (US) 11743

( * ) Notice: Under 35 U.S.C. 154(b), the term of this patent shall be extended for 0 days.

(21) Appl. No.: 09/320,981

(22) Filed: May 27, 1999

(51) Int. Cl.⁷ .................................................. H05B 6/12
(52) U.S. Cl. ......................... 219/621; 165/104; 120/400; 120/246; 222/427
(58) Field of Search .................. 219/621, 622, 219/624, 387, 386, 671, 385, 675, 676, 730, 759; 165/104; 126/400, 246; 220/427

(56) References Cited

U.S. PATENT DOCUMENTS

| | | |
|---|---|---|
| 3,557,774 | 1/1971 | Kreis . |
| 3,739,148 | 6/1973 | Ryckman, Jr. . |
| 3,837,330 | 9/1974 | Lanigan et al. . |
| 4,020,310 * | 4/1977 | Souder, Jr. et al. ................ 219/621 |
| 4,086,907 | 5/1978 | Rothschild . |
| 4,110,587 * | 8/1978 | Souder Jr. et al. ................ 219/622 |
| 4,182,405 | 1/1980 | Hysen et al. . |
| 4,567,877 | 2/1986 | Sepahpur . |
| 4,735,513 | 4/1988 | Watkins et al. . |
| 4,777,930 | 10/1988 | Hartz . |
| 4,783,233 * | 11/1988 | Yasumuro et al. ................. 156/227 |
| 4,788,394 * | 11/1988 | Vanneste et al. .................. 219/636 |
| 5,052,369 | 10/1991 | Johnson . |
| 5,128,522 * | 7/1992 | Marx et al. ........................ 219/385 |
| 5,191,302 * | 3/1993 | Rossnick ............................ 331/109 |
| 5,260,536 * | 11/1993 | Peery ................................. 219/730 |
| 5,369,257 * | 11/1994 | Gibbon .............................. 219/759 |
| 5,445,286 | 8/1995 | Guimarin . |
| 5,460,651 * | 10/1995 | Flinchum et al. ................. 118/419 |
| 5,505,122 * | 4/1996 | Gerrit .................................. 99/476 |
| 5,603,858 * | 2/1997 | Wyatt et al. ....................... 219/620 |
| 5,628,241 | 5/1997 | Chavanaz et al. . |
| 5,750,962 * | 5/1998 | Hyatt .................................. 219/528 |
| 5,786,643 * | 7/1998 | Wyatt et al. ....................... 219/621 |
| 5,880,435 | 3/1999 | Bostic . |
| 5,884,006 * | 3/1999 | Frohlich et al. ................... 392/339 |
| 5,892,202 * | 4/1999 | Baldwin et al. ................... 219/387 |
| 5,916,470 * | 6/1999 | Besser et al. ...................... 219/730 |

* cited by examiner

Primary Examiner—Teresa Walberg
Assistant Examiner—Jeffery Pwu
(74) Attorney, Agent, or Firm—Hoffmann & Baron, LLP

(57) ABSTRACT

A heat maintaining food container includes a container for depositing a food product therein and a ferrous material heated element, which has been heated to a selected temperature by electromagnetic induction heating, positioned in close proximity to the food product. The heated element comprises one or more substantially planar carbon steel sheets having a thickness of about 0.005" to 0.030" and having an insulative layer fixed to one side of the sheet. The sheet is preferably foldable to take the form of a U-shape or an O-shape for substantially surrounding the food product when placed in the container. Alternatively, the material of the food container may contain a ferrous material wherein the container itself is preheated to a selected temperature by electromagnetic induction heating. In a method for maintaining a food product deposited in a container, a substantially planar steel sheet element is heated by electromagnetic induction heating and placed within the container in close proximity to the food product.

10 Claims, 2 Drawing Sheets

HEAT MAINTAINING FOOD DELIVERY CONTAINER

BACKGROUND OF THE INVENTION

1. Field of the Invention

The present invention relates generally to containers for delivery of prepared food and particularly of foods which are desirably maintained at an adequate temperature during delivery.

2. Description of the Prior Art

Fast food restaurants have proliferated to such an extent that the percentage of people who frequent these establishments on a regular basis has increased greatly. Among the reasons for this increase is the availability of quickly prepared foods which may be consumed at the restaurant or may be carried out and consumed at a later time. Many such restaurants are equipped with drive though windows to facilitate such take-out service.

Typically, take-out food is placed within a disposable container which, even if equipped with thermal insulated material, does not retain heat for an appreciable amount of time thereby allowing the food contained therein to cool relatively rapidly. Much time and effort has been devoted to make possible the economical delivery of fast food in a satisfactorily hot condition in a disposable heat-retaining food container. For example, U.S. Pat. No. 5,445,286 to Guimarin discloses a heat retentive pizza box having a heating element comprised of water filled pockets which may be preheated in a microwave oven. The microwaved heating element serves to maintain the temperature of the pizza during delivery. Similarly, U.S. Pat. No. 4,567,877 to Sepahpur discloses a heat storage food container including a compartment for holding a microwavable thermal storage medium, such as wet sand. When preheated in a microwave oven, the wet sand retains the heat of the food placed in the container. U.S. Pat. No. 4,777,930 to Hartz and U.S. Pat. No. 5,880,435 to Bostic both disclose food delivery containers having a heat conductive pouch containing a quantity of a latent heat retaining substance which may be preheated to an initial temperature.

A major drawback of each of the above devices is the time required to preheat the heating element. This is particularly disadvantageous with drive-through take-out food service where food orders are delivered rapidly and continuously during the restaurant's peak operating hours. Accordingly, it would be desirable to provide an economical disposable heat maintaining food container which is quickly preheated to a desired temperature.

OBJECTS AND SUMMARY OF THE INVENTION

It is an object of the present invention to provide an efficient method for maintaining the heat of a food product deposited in a carry out container.

It is another object of the present invention to provide a heat maintaining food container which is rapidly preheated.

It is still a further object of the present invention to provide an economical food container for satisfactorily maintaining the heat of food contained therein.

In accordance with one form of the present invention, the heat maintaining food container generally includes a container having an opening for depositing a food product therein and a ferrous material heated element, which has been preheated to a selected temperature by electromagnetic induction heating, positioned in close proximity to the food product. Preferably, the heated element comprises one or more substantially planar carbon steel sheets having a thickness of about 0.005" to about 0.030" and having an insulative layer fixed to at least one side of the sheet. The sheet is preferably unfoldable to take the form of a U-shape or an O-shape for substantially surrounding the food product when placed in the container. Alternatively, the material of the food container may contain a ferrous material wherein the container itself is heated to a selected temperature by electromagnetic induction heating.

A method for maintaining a food product deposited in a container preferably includes the steps of heating a substantially planar carbon steel sheet element to between about 150° F. and about 200° F. by electromagnetic induction heating and placing the sheet within the container in close proximity to the food product. The heated element may be preheated prior to insertion in the container or may be preheated together with the container.

A preferred form of the heat maintaining food delivery container, as well as other embodiments, objects, features and advantages of the invention will be apparent from the following detailed description of illustrative embodiments thereof which is to be read in conjunction with the accompanying drawings.

DETAILED DESCRIPTION OF THE PREFERRED EMBODIMENTS

Figure 1:
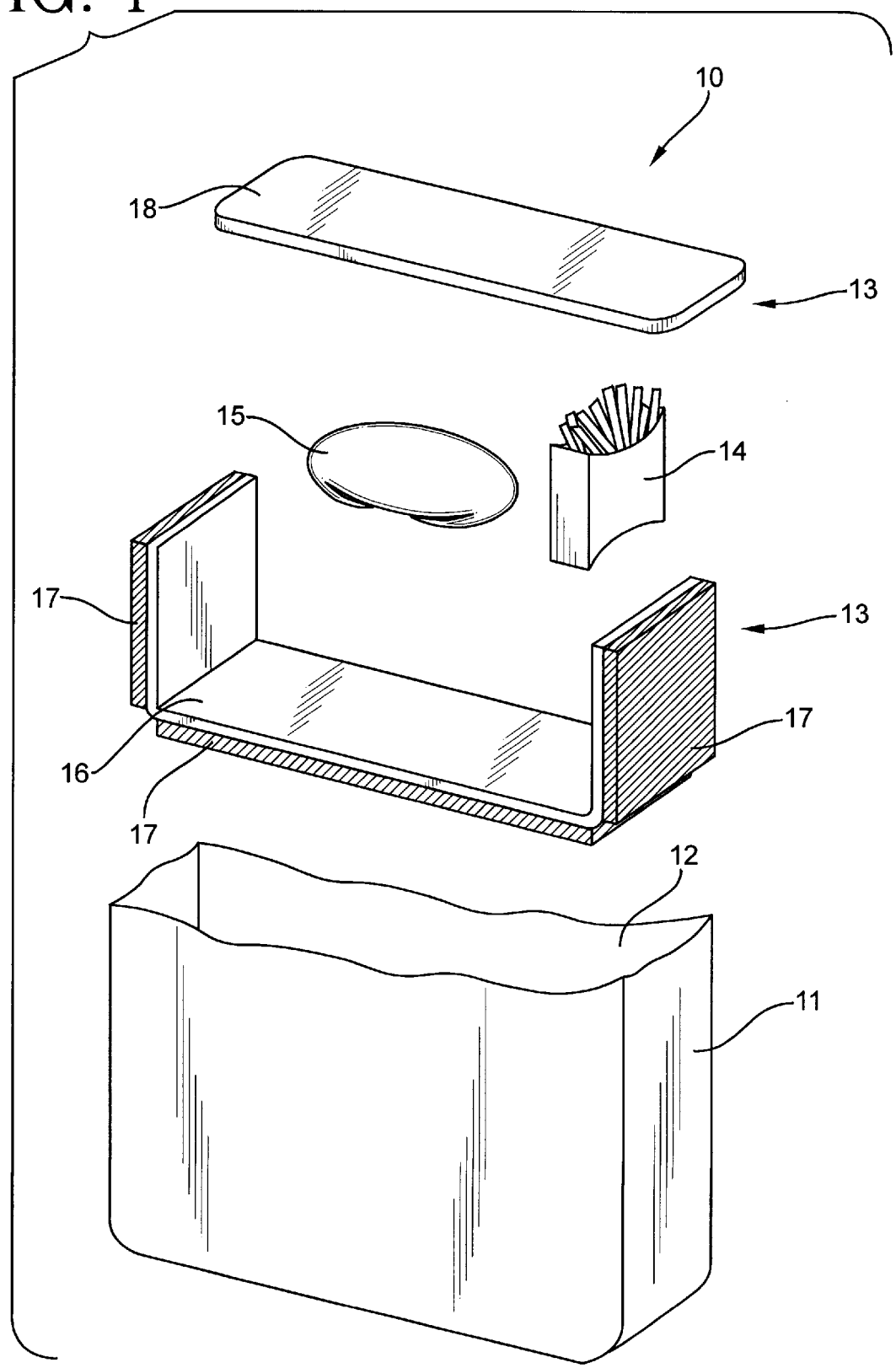
FIG. 1 is an exploded perspective view of the heat maintaining food delivery container formed in accordance with the present invention.

Referring to FIG. 1, the various embodiments of the heat maintaining food delivery container formed in accordance with the present invention are shown. The container 10 generally includes a bag 11 or other suitable container having an opening 12 for depositing a food product therein and one or more heated elements 13 positioned within the bag in close proximity to the food product. Typical food products provided by fast food restaurants include french fries 14 and hamburgers 15 as shown in FIG. 1.

Typically, a paper or plastic bag is provided to contain the food ordered for take-out. However, the present invention may be utilized with any feasible food container such as a cardboard box or a styrofoam carton. In whatever form, the container material must be able to withstand a temperature of approximately 200° F. as will be discussed in further detail below.

Figure 2:
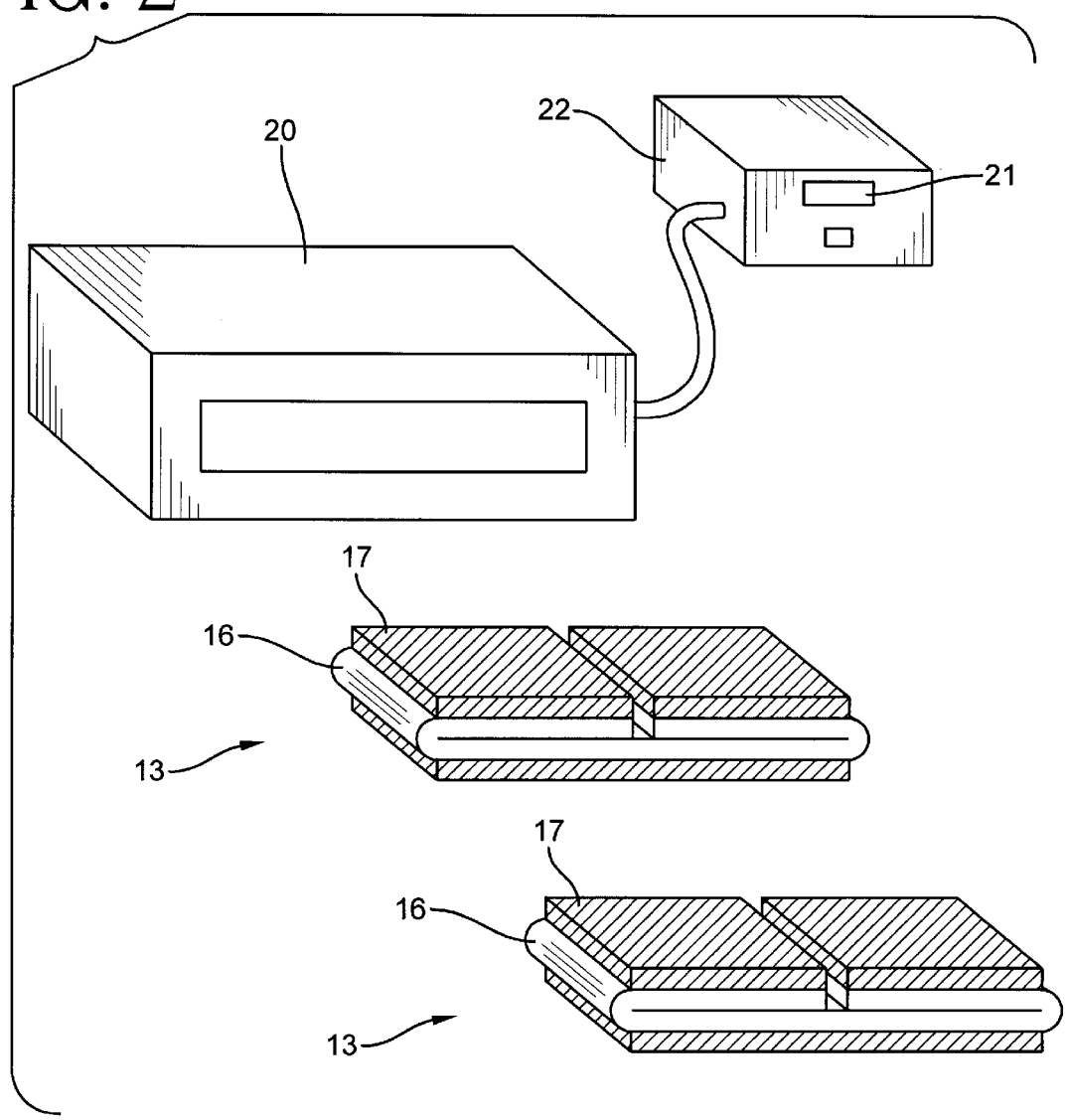
FIG. 2 is a perspective view of the elements of FIG. 1 being preheated in an inductive heating coil.

The heated elements 13 may take any of a variety of forms. In the preferred embodiment, the heated element comprises a 0.005" to 0.030" thick sheet of carbon steel 16 which is foldable over itself for compact storage and heating purposes, as shown in FIG. 2, and which may be unfolded into any desired shape. Preferably the sheet is unfolded into a U-shape or an O-shape which, when inserted into the bag 11, substantially surrounds the food product contained therein. Carbon steel is preferred because it is readily available in relatively thin gauge; however, any thin ferrous sheet material up to a thickness of about 0.060" which is capable of being electromagnetically inductively heated can be used.

Preferably, an insulative layer 17 is fixed to at least one side of the steel sheet 16 for heat retaining and ease of handling purposes. The insulative layer 17 may comprise any conventional insulative material but is preferably an inexpensive material available in sheet form, such as styrofoam or cardboard, which is capable of being bonded or laminated to a ferrous material sheet in an inexpensive conventional manner.

A U-shaped heated element may be placed in the bag with the side walls pointing upwards, as shown in FIG. 1, or may be placed in the bag upside down so long as the ferrous material surfaces are directed inward and in close proximity to the food products. Alternatively, an O-shaped heated element may be utilized to completely surround the food products or one or more planar steel sheets 18 may be used with or without the U-shaped element 16 and with or without an insulative layer on one or both sides. In other words, any combination of one or more single sheets 18 or foldable sheets 16 may be placed in any configuration within the bag 11.

The heated elements 13 are preheated to a selected temperature by electromagnetic induction heating before the food order is given to the consumer. A number of heated elements 13 may be placed in a conventional induction heating coil 20 either alone as shown in FIG. 2 or while positioned in the bag 11. The elements 13 are then preheated for a predetermined amount of time to a temperature of approximately 150° F. to 200° F. It has been found that induction heating of a 0.005" to 0.030" steel plate to this temperature takes approximately 1 to 3 seconds with a 1 to 5 kW induction heating unit. A timer 21 may be provided on the heating coil power supply 22 to ensure proper heating of the elements 13. Once preheated, the element or elements 13 begin to dissipate heat and are preferably placed in the bag 11 in close proximity to the food.

As an alternative to insertable heated elements, the container itself may comprise a ferrous material which is amenable to inductive heating as described above. Specifically, a small amount of ferrous material may be introduced into the container material during manufacture of the container. In this case, no insertable heated elements are required, but instead, the bag itself is preheated within an inductive heating coil prior to placing the food therein.

As a result of the present invention, an economical and disposable heat maintaining food delivery container is provided. It is anticipated that a suitably sized conventional induction heating coil would be situated adjacent to a fast food restaurant counter or a take-out window into which a number of elements and/or ferrous material bags may be cued and preheated. When a take-out order is placed, a restaurant employee can select a preheated element or bag and deposit the food product therein while placing a new element or bag within the induction heating coil. Induction heating provides quick and reliable heating to the element or bag resulting in rapid service to the consumer with substantially no wait.

Although the illustrative embodiments of the present invention have been described herein with reference to the accompanying drawing, it is to be understood that the invention is not limited to those precise embodiments and that various other changes and modifications may be effected therein by one skilled in the art without departing from the scope or spirit of the invention, and that it is intended to claim all such changes and modifications as fall within the scope of the invention.

What is claimed is:

1. A food delivery container for maintaining the heat of food deposited therein comprising:

a container defining an opening for depositing a food product therein; and a heated element made from a ferrous material sheet removably inserted into said container, said heated element being heatable within or separately from said container to a selected temperature by electromagnetic induction heating and wherein said ferrous material sheet is foldable to form a shape for compact electromagnetic induction heating and unfoldable to form a shape for substantially surrounding said food product when removably inserted into said container.

2. The container as defined in claim 1, wherein said heated element further comprises at least one substantially planar insulative layer fixed to at least one side of said ferrous material sheet.

3. The container as defined in claim 1, wherein said ferrous material sheet is carbon steel having a thickness of about 0.005" to about 0.030".

4. The container as defined in claim 1, wherein said heated element is heated to a temperature of about 150° F. to about 200° F.

5. A method for maintaining the heat of a food product deposited in a container comprising the steps of:

heating a ferrous material element to a selected temperature by electromagnetic induction heating; and removably inserting said ferrous material element into said container in proximity to said food product, wherein said ferrous material element is made from a sheet that is foldable to form a shape for compact electromagnetic induction heating and unfoldable to form a shape for substantially surrounding said food product when removably inserted into said container.

6. The method as defined in claim 5, wherein said heated element is heated prior to its being placed in said container.

7. The method as defined in claim 5, wherein said heated element is heated while in said container.

8. The method as defined in claim 5, wherein said heated element further comprises at least one substantially planar insulative layer fixed to at least one side of said ferrous material sheet.

9. The method as defined in claim 5, wherein said ferrous material sheet is carbon steel having a thickness of about 0.005" to about 0.030".

10. The method as defined in claim 5, wherein said heated element is heated to a temperature of about 150° F. to about 200° F.

* * * * *